May 21, 1968 — K. V. CUSHMAN — 3,383,975
SELF-LOCKING INSERT ASSEMBLY
Filed Feb. 21, 1966
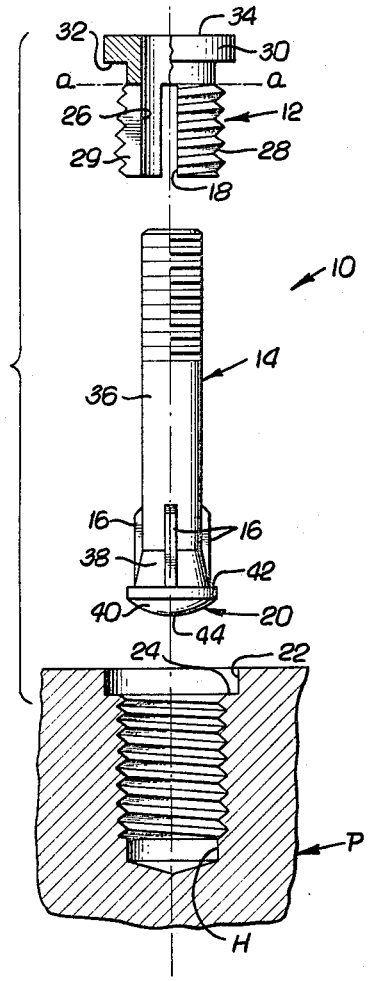
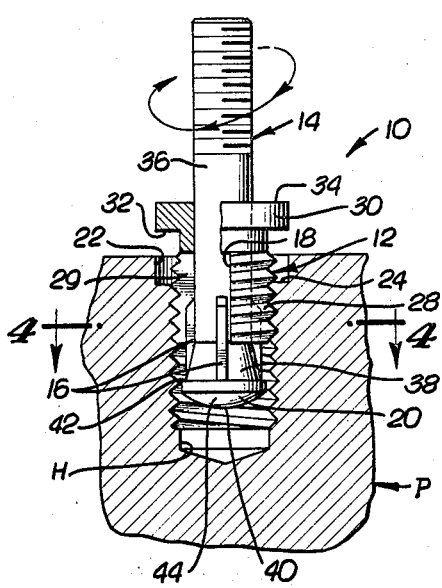
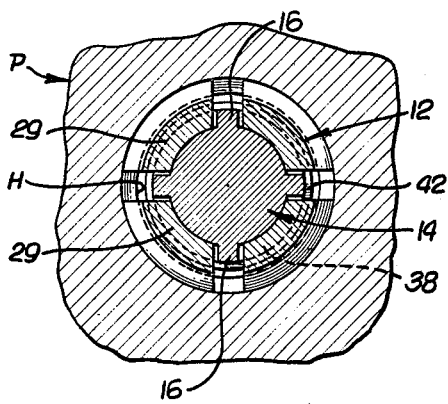
INVENTOR.
KENNETH V. CUSHMAN
By Herzig, Walsh & Blackham
ATTORNEYS.

United States Patent Office 3,383,975
Patented May 21, 1968

1

3,383,975
SELF-LOCKING INSERT ASSEMBLY
Kenneth V. Cushman, Santa Ana, Calif., assignor to The Delron Company, Inc., Santa Ana, Calif., a corporation of Nevada
Filed Feb. 21, 1966, Ser. No. 529,041
1 Claim. (Cl. 85—77)

ABSTRACT OF THE DISCLOSURE

The invention is a stud insert adapted for use in a blind bore. The stud insert has two parts comprising a nut (or sleeve) and an insert stud or bolt held in the bore by the insert. The hole in which the fastener is placed is threaded and the insert nut is threaded. The stud or bolt is fitted to the insert nut before insertion into the hole. The stud has a head at its inner end and adjacent this head it has a taper. The insert nut has a flange head and its sidewalls are axially slotted to receive axial ribs on the stud adjacent to the head. The insert nut and stud may be manually threaded into the hole in the material. Attachment of a part may then be made to the stud and axial force applied to the stud so that its tapered part is forced into the skirt of the insert nut expanding it and locking it in the threaded bore, the head coming up into engagement with the inner end of the insert nut. The engagement between the ribs on the stud and the slots in the nut make it possible to thread the nut into the bore by rotating the stud and after the fastener has been set and the stud is, of course, non-rotatable in the said insert nut.

Summary of the invention

The present invention relates generally to a stud insert assembly, and more particularly to such an assembly which may be readily inserted and locked in position without special tools or operations and which may be readily removed and replaced.

There are various applications where it is desirable to attach secondary parts to a primary part without having fasteners pass through the primary part. In this connection, a stud may be secured to the primary part so as to extend outwardly and through a hole in the secondary part, and a nut may be tightened on the stud to hold the secondary part. While it is desirable that the stud can be quickly and easily attached to the primary part and also that it can be readily detached, it is necessary that, while the stud is attached to the primary part, it be stationary, i.e., resist axial and rotational movement relative to the primary part.

Heretofore, such fasteners have generally been permanently secured and not readily removable. Also, such fasteners have often required special tools and equipment and/or additional operations to secure them in place and/or remove them.

Accordingly, it is an object of the present invention to provide a novel and improved stud insert assembly.

Another object of the present invention is to provide such a stud insert assembly which can be readily attached to a part and/or detached from the part without a special tool and/or an additional operation.

Another object of the present invention is providing such an assembly that is self-locking.

A further object of the invention is to provide such an assembly which is flush with outer surface of part to which it is attached except for the stud itself.

Still another object of the invention is the provision of such an assembly with releasable means that prevent rotation of the stud and provide locking of assembly in place without permanent major deformity of the members of the assembly such as would impede ready removal of the assembly.

Various other objects and advantages of the present invention will become more apparent from the following description and the associated drawings.

The present invention contemplates a stud insert assembly for self-locked positioning in a threaded blind hole in a primary part. The assembly, which includes a stud received for limited axial movement within a sleeve, is screwed into the hole using the stud as a handle to rotate the entire assembly. The stud insert assembly is locked in position by outward axial movement of the stud as when a nut is tightened on the stud to secure a secondary part to the primary part. With the secondary part removed, the assembly is unlocked from the primary part by moving the stud axially inward and the assembly is readily detached using the stud as a handle to unscrew the assembly from the hole.

A preferred embodiment of the invention is described in the foregoing abstract. The two parts comprise an externally threaded axially slotted insert with a flange head and a stud bolt with a head at one end and a taper adjacent the head for expanding and setting the insert in a hole when axial force is applied to the stud bolt. The stud bolt has axial ribs engageable with the slots in the insert so that the insert can be threaded into the hole by the stud bolt and after the fastener is set, relative rotation between the stud bolt and insert is prevented.

In the drawings:

FIGURE 1 is an exploded side view, partly in section, of the members of a stud insert assembly which embodies various features of the present invention, and of a portion of a primary part having a blind threaded hole adapted to receive the assembly;

FIGURE 2 is a side view, partly in section, of the stud insert assembly partially inserted into the hole;

FIGURE 3 is a side view, generally similar to FIGURE 2, but showing the stud insert assembly fully inserted in the hole, and also showing a secondary part and a nut threaded on the stud to lock the assembly in place and secure the secondary part to the primary part; and FIGURE 4 is a sectional view taken generally along line 4—4 of FIGURE 2.

Briefly, the illustrated stud insert assembly 10 includes an externally threaded annular sleeve member 12 and a stud member 14 adapted to extend through the sleeve member. With the members engaged to the extent shown in FIGURE 2, the two members are threaded as a unit into a blind threaded hole H in a primary or first part P. Connection means in the form of engaging ribs 16 and slots 18 on the stud member and sleeve member, respectively, lock the members together for common rotation. Thus, by grasping the outwardly extending end of the stud member and rotating, the sleeve member is threaded into the hole H to the depth shown in FIGURE 3. The inner end of the stud member has locking means in the form of an enlarged tapered head 20. When the stud member is moved axially outward relative to the sleeve member to position the members as shown in FIGURE 3, the inner end of the sleeve member is expanded by the head 20 to lock the sleeve member in position in the hole. Such axial movement may be provided by merely tightening a nut N on the end of the outer end of the stud member to secure a secondary or second part P' to the primary part P. Thus, no special tools and/or operations are required. To remove the stud insert assembly, the nut N and part P' are removed and the stud member is moved axially inwardly as by giving it a sharp blow with a hammer. Then, using the stud as a handle, the assembly is rotated out of the hole H.

The stud insert assembly 10 is illustrated in connection with the primary part P to which it is desired to secure a fastener in the form of a stud. The part P shown in the drawings is of a solid metal such as steel or aluminum, although the illustrated invention has application to the connecting together of parts made from other materials. The part is provided at its outer surface with the hole H which does not extend through the part and is, therefore, accessible only from its open end. The hole H is threaded and has a counterbore 22 at its outer end which forms an annular ledge or shoulder 24. The part P is illustrated with the hole H extending vertically and opening upwardly as a matter of convenience of description, and it will be readily apprehended as the description proceeds that the part and hole could be oriented in various other manners such as with the hole extending horizontally or at a desired angle. The stud insert assembly is adapted to be received in a hole of any desired orientation.

Referring more particularly to the illustrated stud insert assembly 10, the annular sleeve member 12, which is an integrally formed part made from any suitable fastener material such as aluminum alloy or steel, has a central bore 26 which is generally circular in cross-section and extends through the sleeve member from end-to-end. The sleeve member 12 includes an externally threaded generally cylindrical inner section 28 in which the slots 18 are formed. The slots 18 are aligned generally parallel to the axis of the sleeve member, extending from the inner end of the inner section 28 for the greater part of the length of the inner section. There are four slots 18 which are circumferentially equally spaced around the inner section 28 to define four flap or beam portions 29 and are connected to the remainder of the inner section 28 along only one end. The line of connection is designated a—a in FIGURE 1. The sleeve member 12 also includes a circular flange section 30 at its outer end. The flange section 30 provides an inwardly facing annular shoulder 32 and an outer face 34.

The stud member 14 which is also an integrally formed part made from a suitable fastener material, includes an elongated, cylindrical shank section 36 which is connected at its inner end to the head 20 of the stud member. The other outer end of the shank section 36 is threaded. The head 20 includes a tapered connecting or wedging section 38 of generally frusto-conical shape that is joined at its smaller end to the inner end of the shank section 36. The head 20 also includes a cap section 40 joined to the larger end of the connecting section 38 and providing the inner end of the stud member 14. The cap section 40 includes a circular flange or lip 42 and a convex innermost end 44. The four ribs 16 extend axially of the stud member and are circumferentially equally spaced around the stud member. Each rib extends from the lip 42 along the tapered connecting section 38 and for a short distance along the shank section 36.

The sleeve member 12 is proportioned for having its inner section 28 threaded into the hole H with the outer flange section 30 received in the counterbore 22 of the hole. The stud member 14 is proportioned so that its shank section 36 is received by a light press fit through the central bore 26 of the sleeve member. The tapered connecting section 38 is approximately the size at its smaller end of the central bore 26, while its larger end has a substantially larger diameter than that of the central bore 26.

*Operation*

Initially, the primary part P is provided with the threaded hole H having the counterbore 22. The stud member 14 is inserted by the press fit in the sleeve member 12 in the general relation shown in FIGURE 2 so that the outer ends of the ribs 16 have entered the respective slots 18. There will ordinarily be sufficient friction between the parts to releasably hold them in this interconnected condition. Then the sleeve member is screwed or threaded into the hole H. The interengagement of the ribs 16 and the slots 18 causes the two members to rotate together as a unit. It is possible to hold and rotate the outer end of the sleeve member for initially starting its insertion into the hole H. However, in order to fully insert the sleeve member into its position in the hole with the outer flange section 30 received in the counterbore 22 with the outer face 34 flush with the outer surfaces of the part P, it would not be possible to impart rotation to the sleeve member directly without the use of a special tool. But, because of the interconnection between the sleeve member and the stud member, the sleeve member may be fully inserted in the hole by applying rotation to the stud member by hand.

It will be noted that when the sleeve member is thus fully inserted into the hole, its outer surface 34 is generally flush with the outer surfaces of the part P. FIGURE 3 illustrates the position of the sleeve member when it is fully inserted into the hole, although FIGURE 3 shows the stud insert assembly after the stud member has been moved relative to the sleeve member.

After the sleeve member has been fully threaded into the hole H, the secondary part P' is positioned flush with the primary part P with the shank section 36 of the stud member extending freely through a hole H' in the secondary part P'. The flush relationship of the stud insert assembly (other than the stud itself) with the outer surface of the primary part P permits this flush fit between the two parts P and P'. With the secondary part P' so positioned, the nut N and a washer W are placed on the threaded end of the shank section 36 which extends beyond the secondary part P'. The nut N may be tightened on the stud member by the use of ordinary tools (not shown). The stud member is prevented from rotating by the engagement of the ribs and slots. The tightening of the nut tends to move the stud member axially outwardly to a position as shown in FIGURE 3. This outward movement of the stud member relative to the sleeve member causes the ribs 16 to extend further into the slots 18 and also expands the inner end of the sleeve member outwardly to tend to lock the sleeve member in the hole H and thus to lock the entire insert assembly in the hole. More particularly, the tapered connecting section 38 forces the beams 29 of the sleeve member 12 outwardly to provide a locking engagement.

To remove the stud insert assembly, the nut N and the washer W and the secondary part P' are removed. Then the stud member is moved inwardly as by striking it a sharp blow on its extended end with a hammer (not shown). This inward movement will tend to return the stud member to the position relative to the sleeve member as shown in FIGURE 2 and will tend to unlock the sleeve member from the hole. In this connection, the enlarged portion of the tapered connection connecting section 38 is removed from the inward end of the sleeve member to remove the outward pressure on the beams 29. Then, by rotating the stud member, the sleeve member is unscrewed and thereby removed from the hole.

The illustrated structure provides an extremely simple yet effective stud fastener which is readily secured in position without special tools or additional operations. The device 10 is self-locking in position to prevent its working loose due to vibrations or the like, and when fully in position the stud itself is the only portion of the assembly which extends outwardly of the face of the part holding the fastener. The self-locking is accomplished without special tools or operations, as is subsequent unlocking for ready and convenient detachment of the stud fastener.

Various modifications and changes may be made in the illustrated structure without departing from the spirit and scope of the present invention.

Various features of the present invention are set forth in the following claim.

What is claimed is:

1. In a self-locking stud insert assembly comprising an externally threaded sleeve member having an axial bore and adapted to be threaded into a blind threaded hole in a primary part, an elongated stud member having a threaded fastener portion and an unthreaded shank portion, said stud member being adapted to be positioned partially in a hole and extending through the axial bore of said sleeve member and with said threaded fastener portion extending outwardly from the outer end of said sleeve member when said sleeve member is in a hole, four circumferentially spaced longitudinal slots through the inner end portion of sleeve member and four ribs on said stud member, slidably engaged in said slots to limit rotation between said stud and sleeve while permitting relative longitudinal movement therebetween, said stud member having a head at its inner end of larger diameter than the bore in said sleeve member and having a tapered portion adjacent said head whereby outward axial force applied to the said stud member relative to the sleeve member forces the stud into the sleeve member to expand it and thereby set and lock it in the hole, the head being in engagement with the inner end of the sleeve when the assembly is fully locked and set in the hole, said sleeve member having a cylindrical flange head at one end adapted to be received in a counter bore at the end of the hole in which the sleeve is inserted, the outer end of the head being flat, said ribs extending the length of the tapered portion and along part of the untapered portion of said stud.

References Cited

UNITED STATES PATENTS

| | | | |
|---|---|---|---|
| 1,076,388 | 10/1913 | Parrish | 151—31 |
| 2,403,810 | 7/1946 | Lord | 85—83 |

FOREIGN PATENTS

| | | |
|---|---|---|
| 14,860 | 8/1928 | Australia. |
| 319,996 | 11/1902 | France. |
| 54,792 | 12/1890 | Germany. |
| 541,626 | 12/1941 | Great Britain. |
| 601,453 | 5/1948 | Great Britain. |
| 457,893 | 6/1950 | Italy. |
| 342,362 | 12/1959 | Switzerland. |

MARION PARSONS, JR., *Primary Examiner.*